United States Patent
Yamada et al.

(10) Patent No.: US 7,021,433 B2
(45) Date of Patent: Apr. 4, 2006

(54) VEHICLE STEERING DAMPER, STEERING DAMPER KIT FOR MOTORCYCLE, AND MOTORCYCLE INCORPORATING SAME

(75) Inventors: Shinichi Yamada, Saitama (JP); Kiyotaka Sakai, Saitama (JP); Takehiko Nanri, Saitama (JP); Takeshi Wakabayashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/796,572

(22) Filed: Mar. 9, 2004

(65) Prior Publication Data

US 2004/0200680 A1 Oct. 14, 2004

(30) Foreign Application Priority Data

Mar. 20, 2003 (JP) ............................. 2003-079156
Mar. 20, 2003 (JP) ............................. 2003-079158

(51) Int. Cl.
*F16D 57/02* (2006.01)
*F16F 9/14* (2006.01)

(52) U.S. Cl. ...................... 188/294; 188/306; 188/310

(58) Field of Classification Search ............... 188/290, 188/293, 294, 306, 307, 308, 309, 310; 280/272
See application file for complete search history.

(56) References Cited

U.S. PATENT DOCUMENTS

| | | | | |
|---|---|---|---|---|
| 2,814,362 A | * | 11/1957 | Sweeney, Jr. ............... | 188/308 |
| 3,419,114 A | * | 12/1968 | Rumsey ....................... | 188/306 |
| 6,742,794 B1 | * | 6/2004 | Bunya et al. ................ | 280/272 |
| 6,802,519 B1 | * | 10/2004 | Morgan et al. .............. | 280/272 |
| 6,824,153 B1 | * | 11/2004 | Hanawa et al. .............. | 280/272 |
| 2003/0047903 A1 | * | 3/2003 | Hasegawa et al. .......... | 280/272 |
| 2003/0132598 A1 | * | 7/2003 | Bunya et al. ................ | 280/272 |
| 2003/0146594 A1 | * | 8/2003 | Bunya et al. ................ | 280/272 |
| 2004/0211632 A1 | * | 10/2004 | Yamada ....................... | 188/290 |
| 2004/0239069 A1 | * | 12/2004 | Yamada et al. .............. | 280/272 |

FOREIGN PATENT DOCUMENTS

| EP | 1 248 013 A | 10/2002 |
|---|---|---|
| EP | 1 291 276 A | 3/2003 |
| EP | 1 291 276 A2 | 12/2003 |
| EP | 1 375 328 A | 1/2004 |

* cited by examiner

*Primary Examiner*—Thomas Williams
(74) *Attorney, Agent, or Firm*—Carrier, Blackman & Associates, P.C.; William D. Blackman; Joseph P. Carrier

(57) ABSTRACT

A steering damper in a motorcycle includes a vane partitioning a chamber in a damper housing into two oil chambers, wherein hydraulic fluid flows between the two chambers to generate attenuating force. The steering damper also includes a damper shaft connected to the vane and supporting the vane for rocking motion with respect to the housing, and a hydraulic pressure control valve. The housing is attached to a head pipe, and the damper shaft is attached to a steering system. When the head pipe is to be attached to the housing, the housing is extended rearwardly behind a top bridge, and a linear solenoid for driving and controlling the hydraulic pressure control valve is attached to the housing and disposed below the extension thereof.

16 Claims, 12 Drawing Sheets

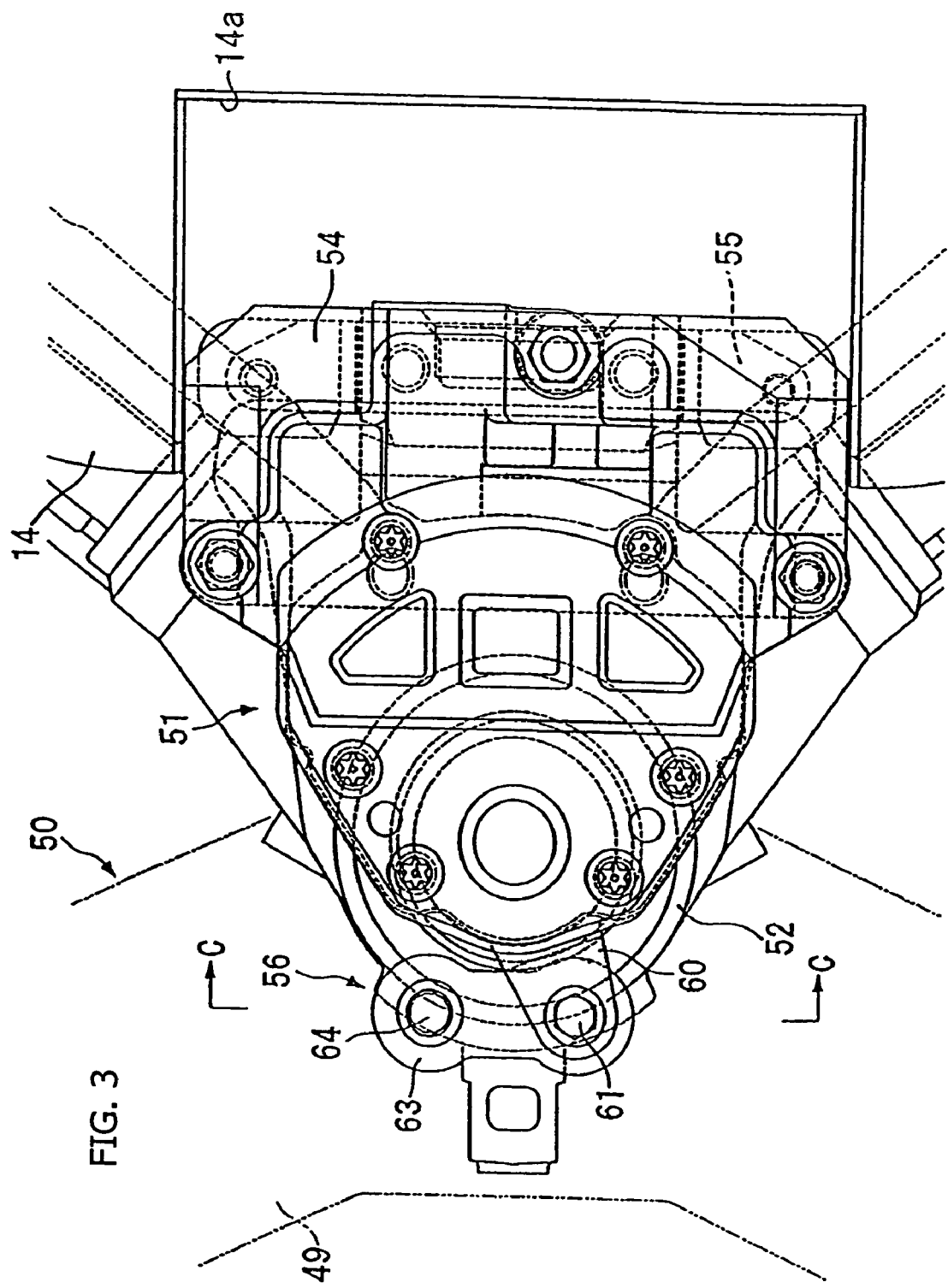

14-a Lower limit to dispersion of relief valve —◇—

14-b Upper limit to dispersion of electric pressure control valve —-□—-

14-c Upper limit to dispersion of relief valve —◇—

14-d Lower limit to dispersion of electric pressure control valve —-■—-

15-a Lower limit to dispersion of relief valve
15-b Upper limit to dispersion of electric pressure control valve 16-a Upper limit to dispersion of relief valve
16-b Lower limit to dispersion of electric pressure control valve

VEHICLE STEERING DAMPER, STEERING DAMPER KIT FOR MOTORCYCLE, AND MOTORCYCLE INCORPORATING SAME

CROSS-REFERENCE TO RELATED APPLICATIONS

The present invention claims priority under 35 USC 119 based on Japanese patent applications 2003-079156 and 2003-079158, both filed Mar. 20, 2003.

BACKGROUND OF THE INVENTION

1. Field of the Invention

The present invention relates to vehicular steering dampers and related hardware. More particularly, the present invention relates to steering dampers and related attaching structure for a motorcycle, and to a motorcycle incorporating the novel steering damper.

2. Description of the Background Art

As a conventional attaching structure for a steering damper in a motorcycle, a steering damper attaching structure is known which includes a rotary-type steering damper wherein, upon rocking motion of a vane which partitions an oil chamber in a housing into two oil chambers, working fluid flows between the two oil chambers to generate attenuating force. (see, for example, Japanese Patent Laid-Open No. 2002-302085 (left column of page 3, FIGS. 2 and 3)). In this known structure, the steering damper includes a shaft having a base portion of the vane connected thereto in a fixed state, and supporting the vane for rocking motion with respect to the housing. The known steering damper described in the reference further includes a hydraulic pressure control valve, for varying the attenuating force of the steering damper. In this known attaching structure for a steering damper in a motorcycle, the housing is attached to a steering system side while the shaft is attached to a vehicle body frame side.

The conventional attaching structure for a steering damper in a motorcycle described above has the following characteristics.

In particular, the steering damper of the known rotary type is attached above a top bridge of the motorcycle. However, it is necessary to provide an actuator or driving means, such as a solenoid, in order to drive and control the hydraulic pressure control valve provided in the connecting path between the two oil chambers in the damper housing, as a hydraulic pressure control valve for adjusting the attenuating force.

The actuator requires a comparatively large mounting space, however, the position above the top bridge, where the steering damper of the rotary type described above is disposed, only has a very small space available, in which a fuel tank is disposed rearwardly in a crowded relationship and an ignition switch is disposed forwardly. Besides, the position above the top bridge is a place where various components of the steering system are disposed, such as the top bridge, front fork and so forth. Thus, it is difficult to find space for the actuator, which generally takes up a large mounting space, in such a place which is narrow and small and in which various movable parts are disposed.

The present invention has been made in view of such circumstances as described above, and it is an object of the present invention to provide an attaching structure for a steering damper in a motorcycle wherein actuator can be beneficially situated, even where the actuator requires a comparatively large arrangement space for driving and controlling a hydraulic pressure control valve for adjusting attenuating force.

Although the known devices have some utility for their intended purposes, there is still a need to provide improved attaching structure for a steering damper in a motorcycle. More particularly, there is a need for an improved steering damper and related attaching structure for a motorcycle, including components designed to solve the above-mentioned problems.

SUMMARY OF THE INVENTION

In order to solve the deficiencies described above, according to a first aspect of the present invention, an attaching structure is provided for a steering damper in a motorcycle which includes a rotary steering damper (for example, a steering solenoid 51 in an embodiment). In the steering damper according to the first aspect, upon rocking motion of a vane (for example, a vane 75 in the embodiment) which partitions an oil chamber in a housing (for example, a damper housing 52 in the embodiment) into left and right oil chambers (for example, oil chambers 74a and 74b in the embodiment), working fluid flows between the two oil chambers to generate attenuating force.

The steering damper according to the first aspect also includes a shaft (for example, a damper shaft 53 in the embodiment) having a base portion of the vane connected thereto in a fixed state, and supporting the vane for rocking motion with respect to the housing, and a hydraulic pressure control valve (for example, a hydraulic pressure control valve 68 in the embodiment) for varying the attenuating force of the steering damper.

The damper housing according to the first aspect is adapted to be attached to one of a vehicle body frame (for example, a vehicle body frame 2 in the embodiment) side and a steering system side (for example, a steering system 50 in the embodiment) while the shaft is adapted to be attached to the other of the vehicle body frame side and the steering system side. The housing is configured for installation on a motorcycle above a top bridge (for example, a top bridge 49 in the embodiment).

Also according to the first aspect hereof, the attaching structure is characterized in that the housing extends rearwardly behind the top bridge and actuator, (for example, a linear solenoid 69 in the embodiment), for the hydraulic pressure control valve, is advantageously located below the extension (for example, an extension 52a in the embodiment) of the housing.

According to a second aspect hereof, the attaching structure for a steering damper in a motorcycle according to the first aspect is characterized in that the housing is attached to the vehicle body frame side, and the shaft is attached to the steering system side.

Usually, in a motorcycle, a gap is formed between a top bridge and a fuel tank disposed rearwardly of the top bridge. In the present invention, however, in order to effectively utilize the gap, the housing is disposed such that it extends rearwardly beyond the top bridge, and besides, the actuator for the hydraulic pressure control valve is disposed below the extension of the housing which extends rearwardly farther than the top bridge. Consequently, effective utilization of the gap between the top bridge and the fuel tank can be anticipated. Further, the actuator does not project upwardly from the housing, and interference between the actuator and a movable member in the proximity of the top bridge can be prevented.

Further, where the housing is attached to the vehicle body frame side while the shaft is attached to the steering system side, this is equivalent to the fact that the housing and the actuator are secured to the vehicle body frame side. In this instance, the relief of the vehicle body side can be reduced when compared with that in an alternative case wherein the housing is attached to the steering system side which is a movable side.

An attaching structure for a steering damper in a motorcycle according to the present invention is described below with reference to the drawings. It is to be noted that, in the following description, such directions as forward and rearward directions and leftward and rightward directions are represented with reference to the vehicle body.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3 is a plan view showing the attaching structure for a steering damper in the motorcycle of FIG. 1.

DETAILED DESCRIPTION

Figure 1:
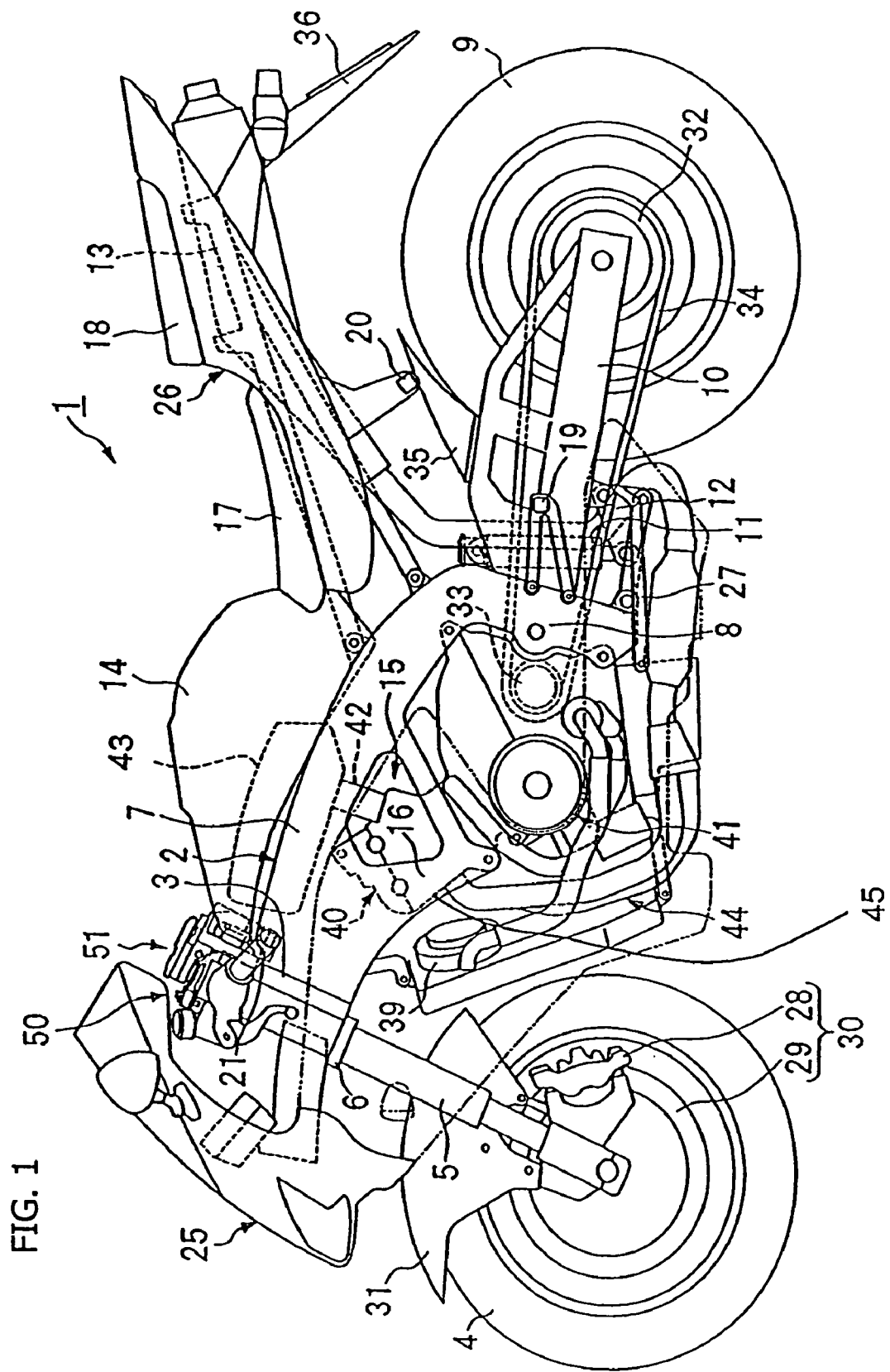
FIG. 1 is a side elevational view of a motorcycle, incorporating a selected illustrative embodiment of the present invention.

Referring now to the drawings, a motorcycle 1 includes a vehicle body frame 2 substantially at the center thereof, as shown in FIG. 1. A head pipe 3 is provided at a front end of the vehicle body frame 2, and a front fork 5 is supported on the head pipe 3 through a steering stem 6. The front fork 5 rotatably supports a front wheel 4 at the lower end thereof.

The vehicle body frame 2 also includes a main frame 7, which extends obliquely rearwardly and downwardly from the head pipe 3. The main frame 7 is bifurcated and forks to the left and right as it extends behind the head pipe 3. The main frame 7 further extends rearwardly through a bent portion thereof, as shown. A pivot connection 8 is provided at a front end portion of a substantially central portion of the portion of the main frame 7 which extends downwardly, and a rear fork 10 is supported by the pivot connection 8 for rocking motion.

A rear wheel 9 is supported on the back of the rear fork 10. Further, an intermediate portion of the rear fork 10 is connected to the main frame 7 through a rear cushion 11 and a link portion 12.

A seat frame 13 is connected rearwardly of the main frame 7. A fuel tank 14 is disposed above the main frame 7, and an engine body 15 of a water-cooled parallel four-cylinder engine is disposed below the main frame 7. An engine hanger 16 extends downwardly from a front portion of the main frame 7. The engine hanger 16 cooperates with the other engine body supporting attaching portions provided on the main frame 7 to support the engine body 15.

A seat 17 for a driver and a pillion 18 for a passenger are supported on the seat frame 13 rearwardly of the fuel tank 14. A step 19 for a driver is attached to a rear portion of the pivot portion 8 of the vehicle body frame 2, and a step 20 for a passenger is attached to a lower portion of the seat frame 13. Further, a pair of left and right handlebars 21, 21 are attached to an upper end portion of the front fork 5 through a top bridge 49.

A front portion of the vehicle body of the motorcycle 1 is covered with a front cowl 25, and the periphery of the seat frame 13 is covered with a rear cowl 26. Further, a retractable side stand 27 is disposed at a lower portion of the left side of the vehicle body frame 2, such that the vehicle body of the motorcycle 1 is supported in a leftwardly inclined upright state by the side stand 27.

A brake caliper 28 is attached to a lower end portion of the front fork 5 and a brake rotor 29 corresponding to the brake caliper 28 is attached to the front wheel 4, thereby forming a front brake apparatus 30. Further, a front fender 31 is attached to a lower end portion of the front fork 5 and covers an upper portion of the front wheel 4.

A rear sprocket wheel 32 is attached to the left wide of the rear wheel 9 for integral rotation with the rear wheel 9. A drive chain 34 extends between and around the rear sprocket wheel 32 and a driving sprocket wheel 33 disposed on the left side of a rear portion of the engine body 15 so that driving force of the engine body 15 is transmitted to the rear wheel 9.

A front side rear fender 35 is attached to an upper portion of the rear fork 10 and covers the front side of an upper portion of the rear wheel 9. A rear fender 36 is attached to a lower portion of the rear cowl 26 and covers the rear side of an upper portion of the rear wheel 9. It is to be noted that a rear brake apparatus having a configuration similar to that of the front brake apparatus 30 for the front wheel 4 is provided on the rear fork 10.

A cylinder body 40 of the engine body 15 is disposed in a rather forwardly inclined state on a crankcase 41. Throttle bodies 42, corresponding to the individual cylinders, are connected to a rear portion of the cylinder body 40, and are further connected to an air cleaner case 43 disposed between the main frame 7 and the fuel tank 14. Further, exhaust pipes 44 corresponding to the cylinders are connected to a front portion of the cylinder body 40. The exhaust pipes 44 extend forwardly from a front wall 45 of the cylinder body 40 and are curved downwardly, and then extend rearwardly of the engine body 15 passing the front and the bottom of the crankcase 41.

The steering stem 6, the top bridge 49 disposed above and in parallel to a bottom bridge of the steering stem 6, the handlebars 21 and so forth form a steering system 50 for steering the front wheel 4. A steering damper 51 is interposed between the steering system 50 and the vehicle body frame 2 (refer to FIGS. 2 and 3).

Two types of steering damper 51 including the rod type and the rotary type are usually available, and the steering damper 51 used here is of the rotary type, which is superior in terms of compact size.

Figure 2:
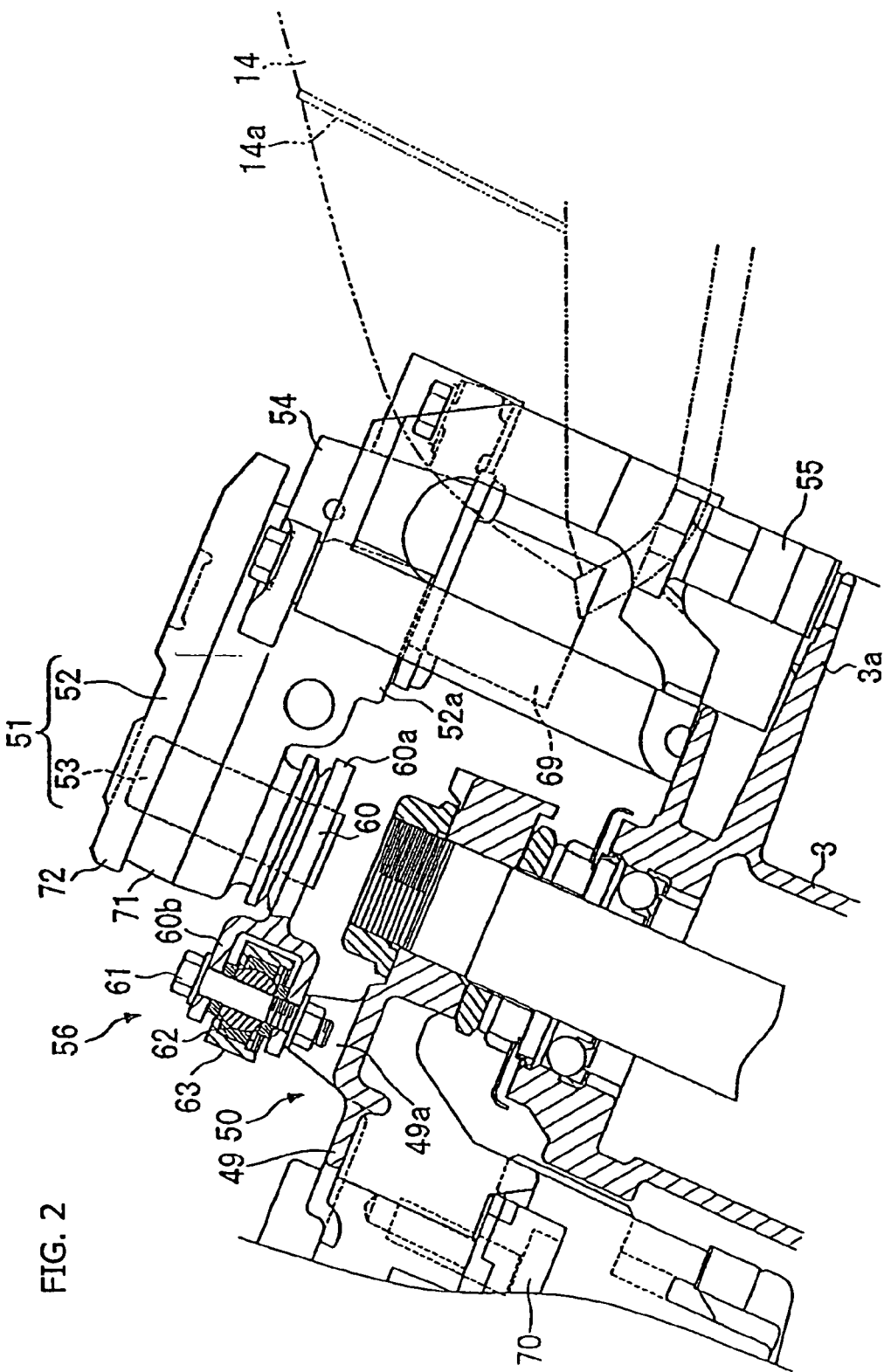
FIG. 2 is a side elevational view, partly in section, showing an attaching structure for a steering damper in the motorcycle of FIG. 1.

As shown in FIG. 2, the steering damper 51 includes a damper housing 52 and a damper shaft 53, which extends through a lower face portion of the damper housing 52, and projects outwardly therefrom. As best seen in FIG. 3, the damper housing 52 is attached to an integral attaching flange 3a on the head pipe 3, via first and second brackets 54 and 55. The attaching flange 3a is integrally provided on, and extends rearwardly from the head pipe 3, and is substantially transverse to a longitudinal axis of the head pipe.

The damper shaft 53 is attached to the top bridge 49 through a linkage 56, which will be described in further detail below.

The First Bracket

Figure 4A:
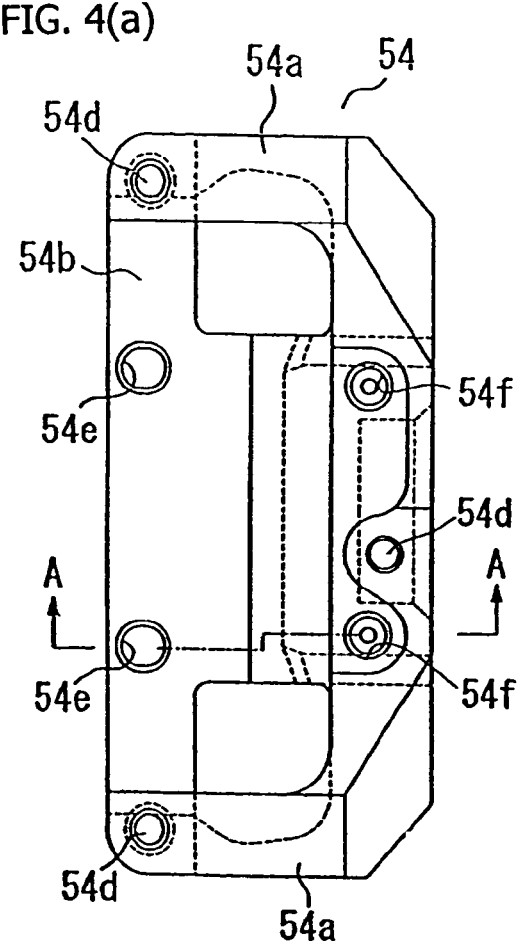
FIG. 4(a) is a top plan view of a first bracket for attaching the steering damper.
Figure 4B:
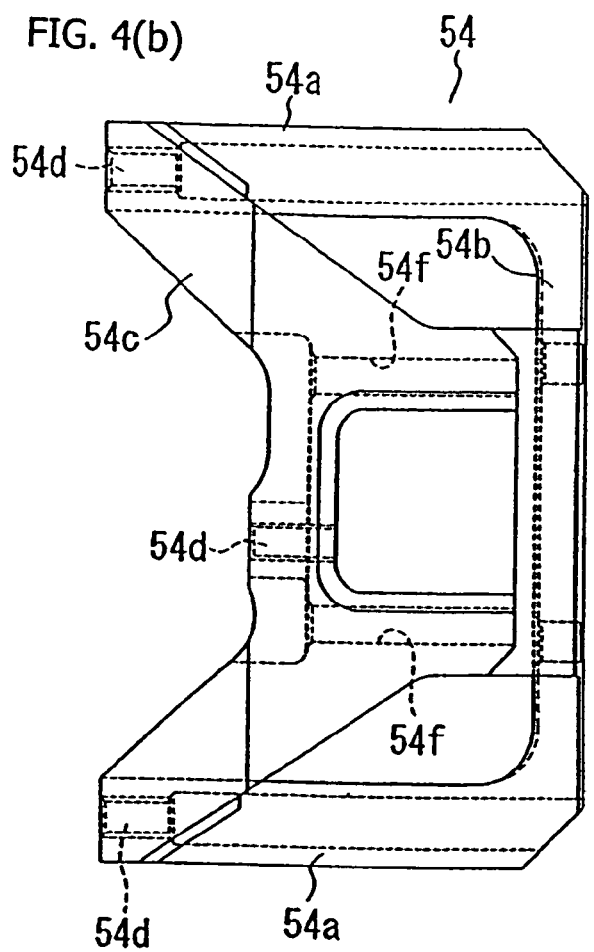
FIG. 4(b) is a side elevational view of the first bracket for attaching the steering damper.
Figure 4C:
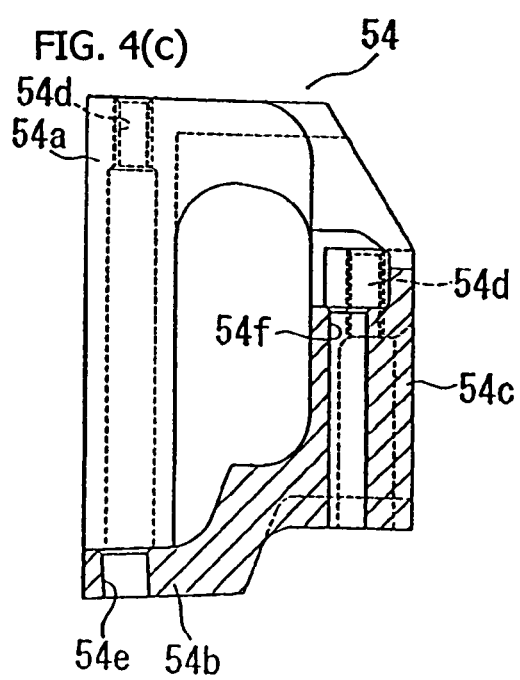
FIG. 4(c) is a sectional view of the first bracket for attaching the steering damper, taken along line A—A of FIG. 4(a).

As shown in FIG. 4, the first bracket 54 has a substantially box-like shape and is hollow in the inside thereof. The first bracket 54 includes left and right side wall portions 54a, 54a, a bottom plate portion 54b, and a substantially Y-shaped leg portion 54c.

The leg portion 54c is connected to rear end portions of the side wall portions 54a and bottom plate portion 54b. Attaching holes 54d, 54d, 54d are formed at upper face portions of the left and right side plate portions 54a, 54a and an upper face portion of the leg portion 54c, and the steering damper 51 is bolted through the attaching holes 54d.

Further, attaching object holes 54e, 54e are formed in the bottom plate portion 54b while attaching object holes 54f, 54f are formed in the leg portion 54c. The first bracket 54 is bolted to the attaching portion 3a of the head pipe 3 through the attaching object holes 54e.

The Second Bracket

Figure 5A:
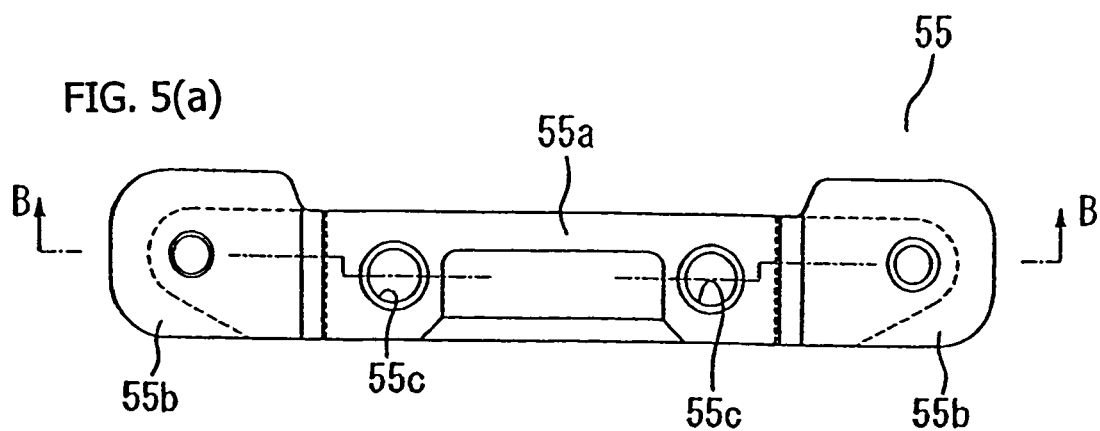
FIG. 5(a) is a plan view of a second bracket for attaching the steering damper.
Figure 5B:
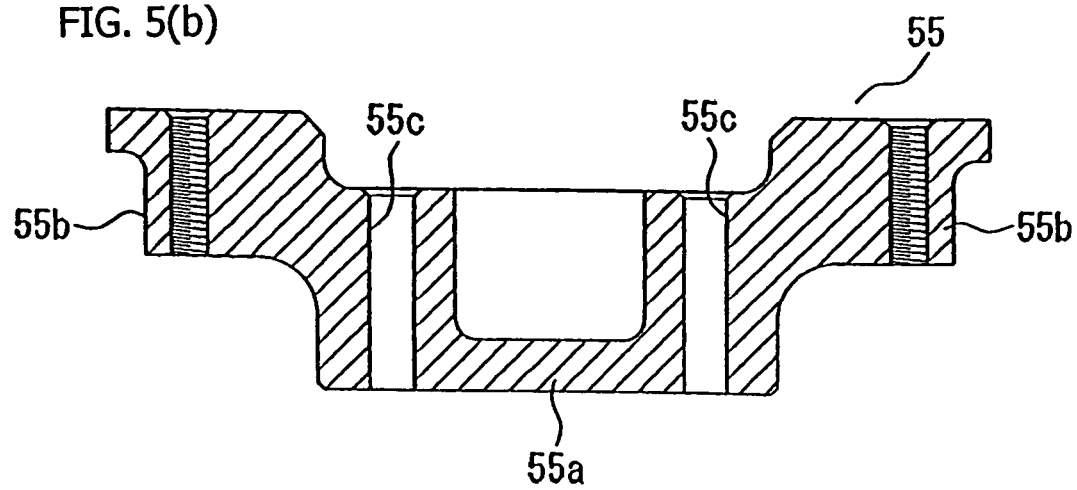
FIG. 5(b) is a sectional view of the second bracket for attaching the steering damper, taken along line B—B of FIG. 5(a).

As shown in FIG. 5, the second bracket 55 has a base portion 55a formed in a substantially parallelepiped block shape, and left and right wing portions 55b, 55b extending upwardly from the opposite sides of the base portion.

Attaching object holes 55c, 55c are formed in the base portion 55a so as to be coaxial with the attaching object holes 54f, 54f of the first bracket 54.

During installation of the brackets 54, 55, the second bracket 55 is placed above the first bracket 54, and a single bolt is inserted into each of corresponding ones of the attaching object holes 54f and the attaching object holes 55c, aligned coaxially with each other. The second bracket 55 is thereby attached to the attaching portion 3a of the head pipe 3, together with the first bracket 54.

Figure 6:
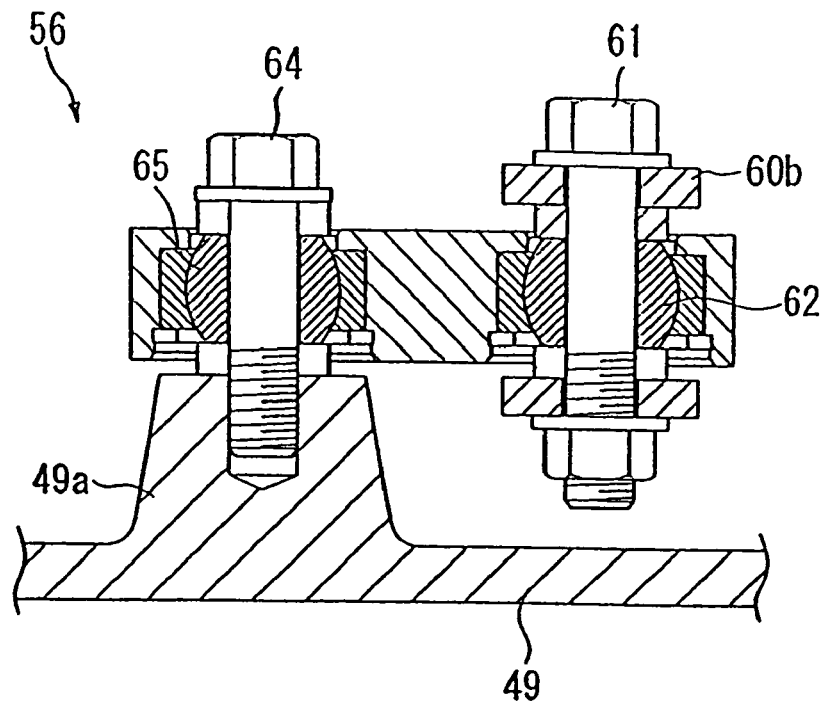
FIG. 6 is a sectional view of the motorcycle attaching structure of FIG. 3, taken along line C—C of FIG. 3.
Figure 7:
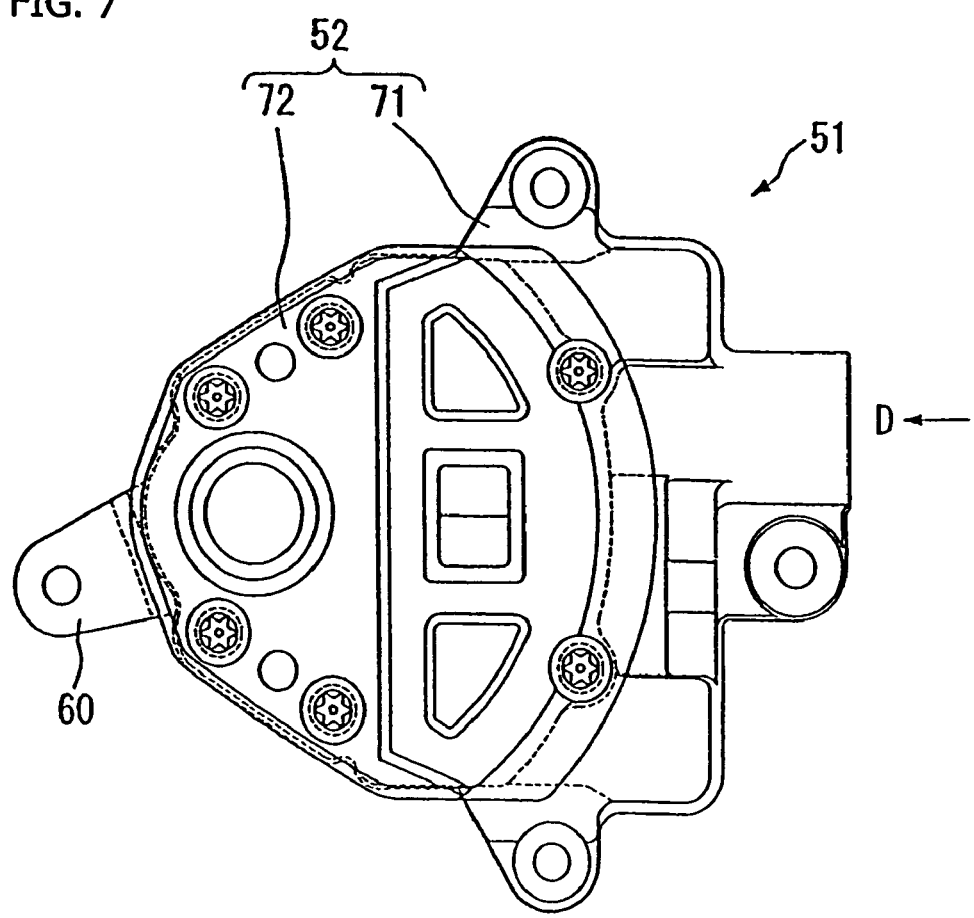
FIG. 7 is a top plan view of the steering damper.
Figure 8:
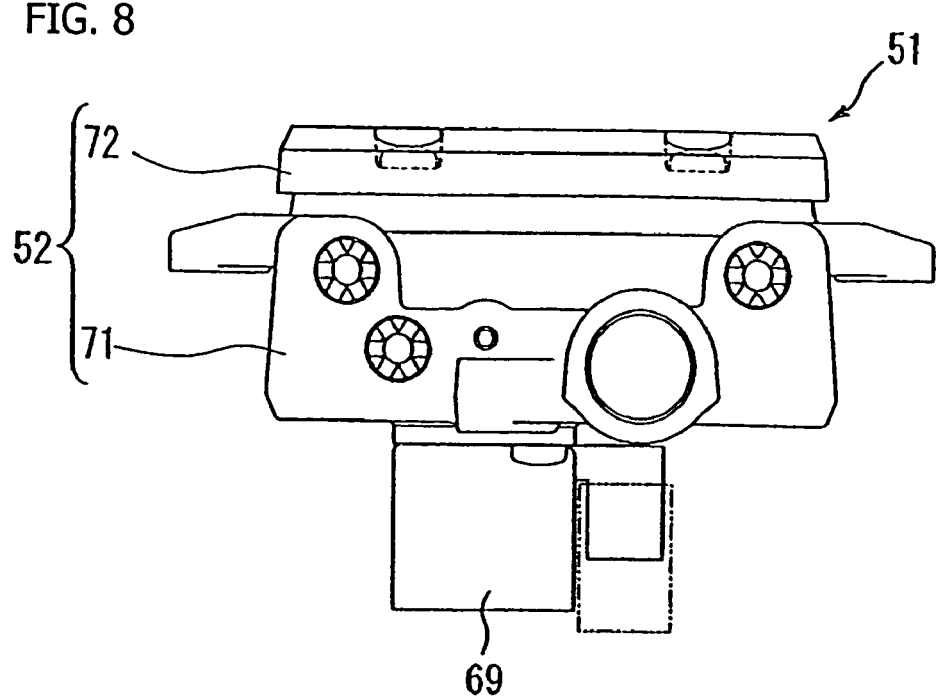
FIG. 8 is a detail view of the steering damper of FIG. 7, as viewed in the direction indicated by an arrow mark D of FIG. 7.
Figure 9:
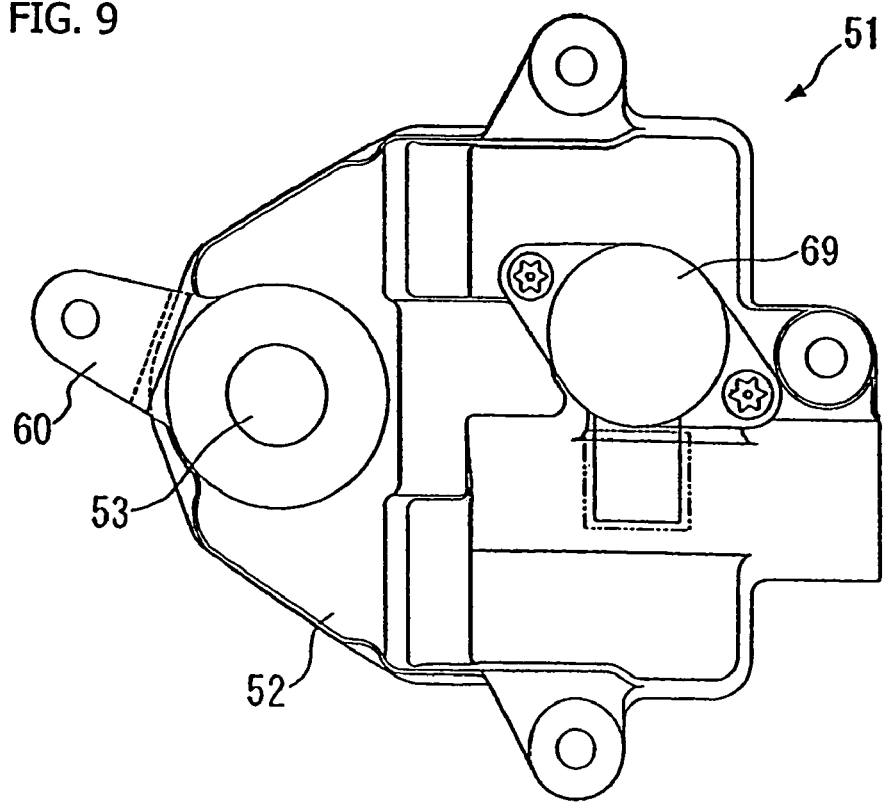
FIG. 9 is a bottom plan view of the steering damper.

The linkage 56 will now be described. As shown in FIGS. 2, 3 and 6, a steering torque transfer arm 60 is fixedly attached, at an end portion 60a thereof, to the damper shaft 53, which projects downwardly from the steering damper 51.

A spectacle-shaped link member 63 (FIG. 3) is supported spherically, at one end portion thereof, on the bifurcated other end portion 60b of the steering torque transfer arm 60 through a bolt 61, a ball member 62 fitted on an outer periphery of the bolt 61 and so forth. Further, the link member 63 is supported spherically at the other end portion thereof on an attaching portion 49a formed on the top bridge 49 through a bolt 64 and a ball member 65 fitted on an outer periphery of the bolt 64.

In short, the linkage 56, for transmitting a motion of the top bridge to the damper shaft 53, is formed from the steering torque transfer arm 60, bolts 61 and 64, ball members 62 and 65 and link member 63. Through this linkage 56, pivotal movement of the steering column, caused by movement of the handlebars 21 which moves the top bridge 49, is transferred to pivotal movement of the damper shaft 53.

The damper shaft 53 of the steering damper 51 is indirectly attached to the top bridge 49 through the linkage 56 including the steering torque transfer arm 60. The housing 52 of the steering damper 51 extends rearwardly of the top bridge 49, as shown.

A linear solenoid 69, which is an example of an actuator for driving and controlling a hydraulic pressure control valve 68, is attached to and disposed below the housing extension 52a which extends rearwardly on the damper housing 52, behind the top bridge 49.

A recess 14a is formed at a front portion of the fuel tank 14, in order to prevent interference of the fuel tank 14 with the steering damper 51 and/or the first and second brackets 54 and 55. It is to be noted that, in FIG. 2, reference numeral 70 denotes an ignition switch disposed forwardly of the head pipe 3.

As shown in FIGS. 7 to 11, the damper housing 52 of the steering damper 51 includes a body 71 and a cap 72 removably attached to the top of the body. A recess 73 (FIG. 11) is formed in an upper face portion of the body 71, and is covered with the cap 72 to form an oil chamber 74. The oil chamber 74 is partitioned into left and right oil chambers 74a and 74b by a vane 75.

Figure 10:
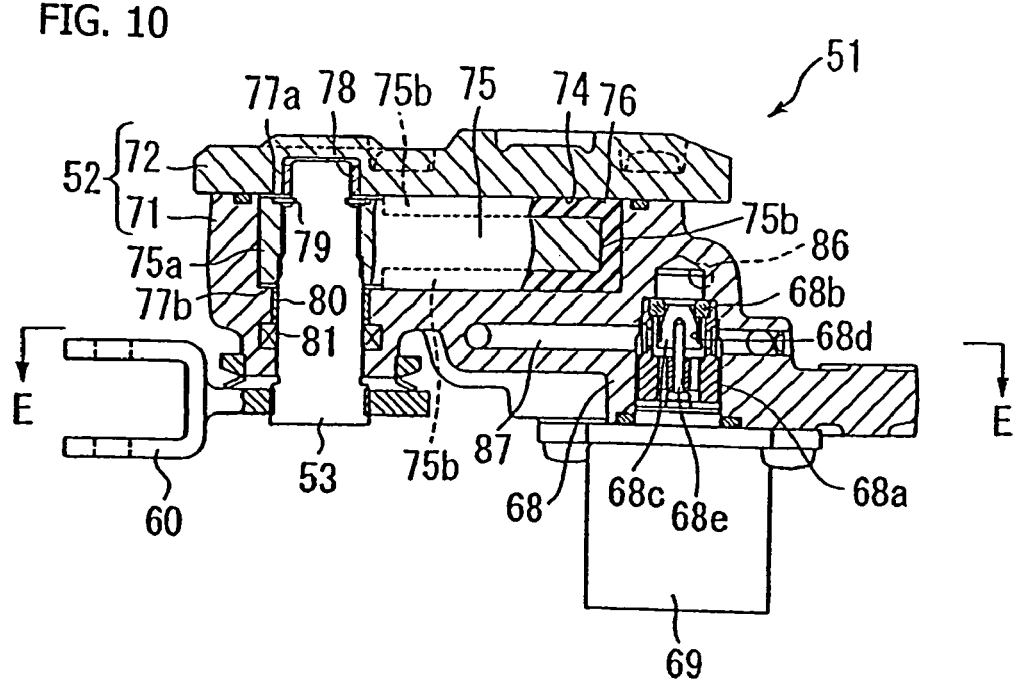
FIG. 10 is a sectional view of the steering damper.

As shown in FIG. 10, a base portion 75a of the vane 75 is formed in a cylindrical shape, and the damper shaft 53 is connected in a fixed state to the cylindrical portion 75a through a fixing mechanism such as splines, so that the vane 75 rotates integrally and concurrently together with the damper shaft 53. Further, the vane 75 is supported for rocking motion with respect to the damper housing 52 by the damper shaft 53.

Grooves 75b are formed continuously along an upper end portion, a lower end portion and a rear end portion of the vane 75, and these grooves generally face toward an inner peripheral face of the oil chamber 74. A seal member 76 is fitted in the grooves 75b, and has a channel shape conforming to the shape of the grooves 75b. Here, the grooves 75b and the seal member 76 do not extend to the damper shaft 53, but are formed to extend or be fitted to a position with a gap left from the damper shaft 53.

As shown in FIG. 10, sealing washers 77a and 77b are fitted on an outer periphery of the damper shaft 53, such that they contact upper and lower faces of the base portion 75a of the vane 75. The outer peripheries of the upper and lower sealing washers 77a and 77b are held in contact the seal member 76. In short, the two oil chambers 74a and 74b partitioned in the damper housing 52 are held liquid-tight from each other by the seal member 76 and the sealing washers 77a and 77b and further held liquid-tight from the damper shaft 53.

A bushing 78 is fitted at a portion of the damper shaft 53 on the upper side thereof, with respect to the location of the damper shaft 53 at which the sealing washer 77a is fitted. Further, a circlip 79 is fitted at another portion of the damper shaft 53, below the bushing 78 and above the vane 75. Meanwhile, a bushing 80 and an oil seal 81 are fitted at a portion of the damper shaft 53 below the lower side sealing washer 77b.

Figure 11:
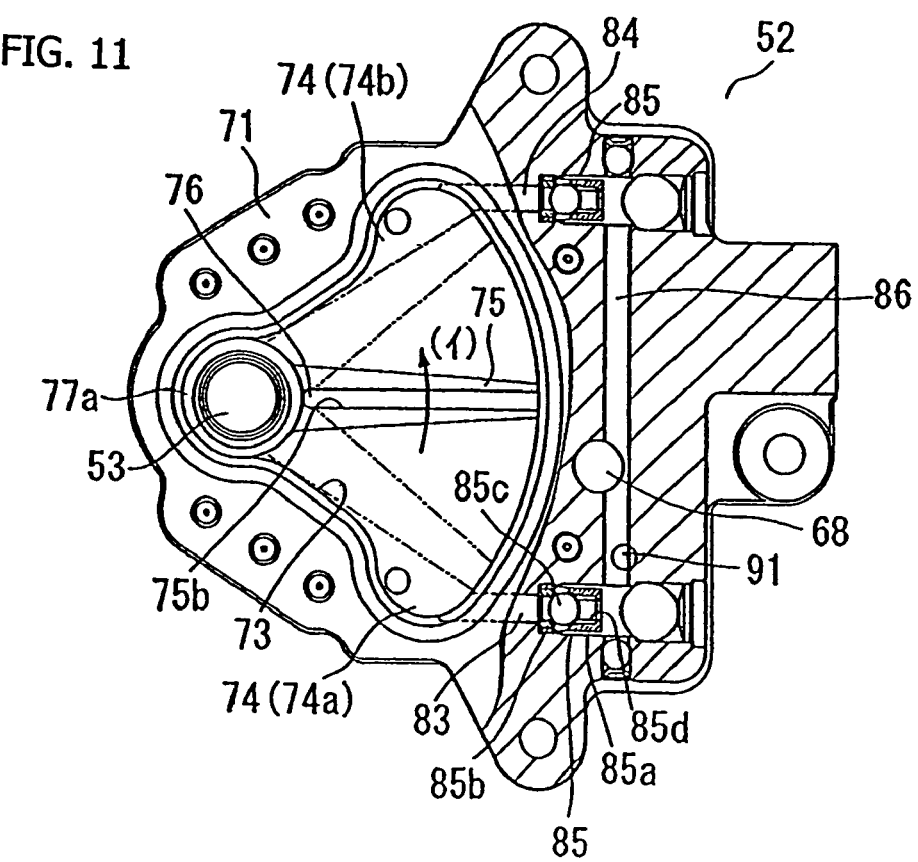
FIG. 11 is a plan view, partly in section, of a housing body of the steering damper.
Figure 12:
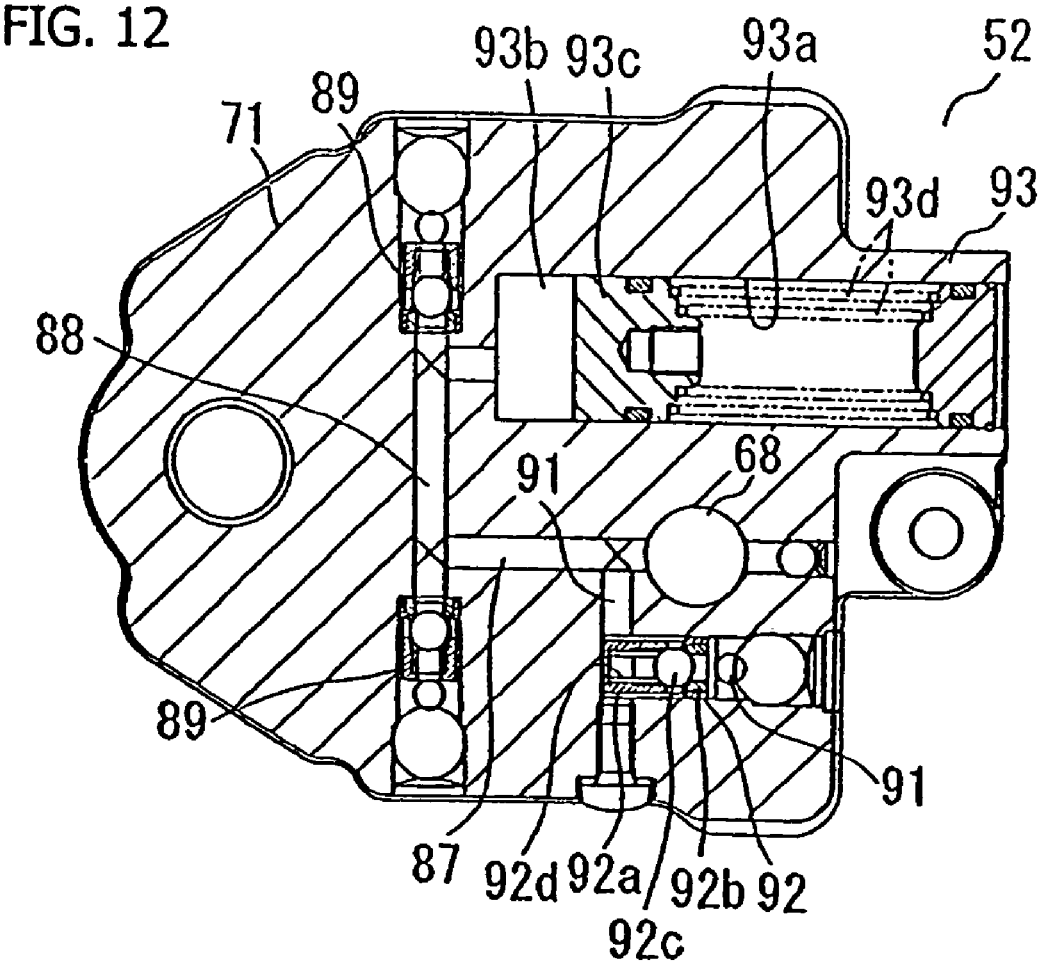
FIG. 12 is a sectional view of the steering damper, taken along line E—E of FIG. 10.
Figure 13:
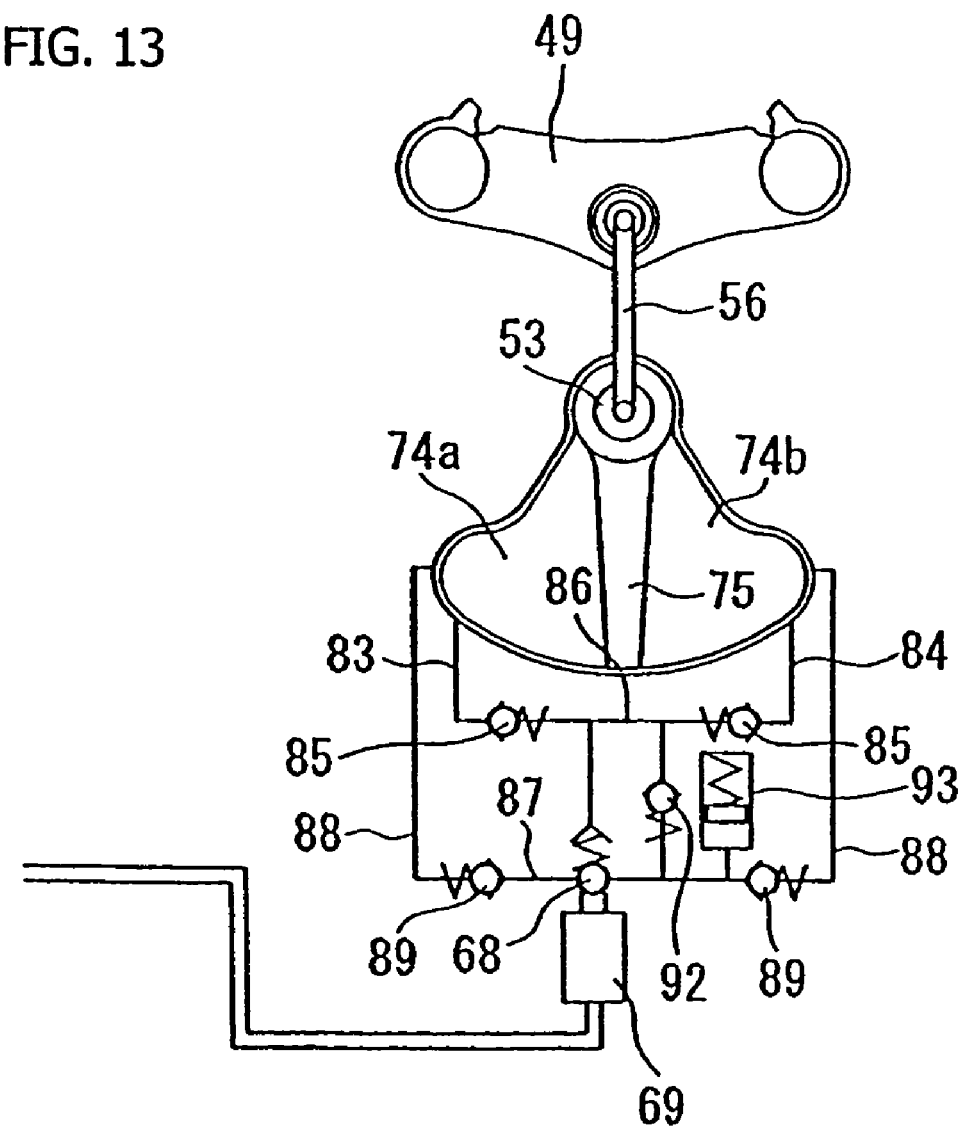
FIG. 13 is a schematic view showing a configuration of the steering damper.

As shown in FIGS. 10 to 12, oil paths 83 and 84 are formed in the body 71 of the damper housing 52, and these oil paths communicate with the left and right oil chambers 74a and 74b, respectively. The oil paths 83 and 84 extend further rearwardly from rear ends of the inner peripheral faces of the oil chambers 74a and 74b, substantially parallel to each other. Check valves 85, 85 are interposed in the oil paths 83 and 84.

Further, an oil connecting path 86 is formed at and substantially perpendicularly to rear end portions of the oil paths 83 and 84 such that it communicates the oil paths 83 and 84 with each other. The oil connecting path 86 is connected to a lower stage side oil path 87 through the hydraulic pressure control valve 68 disposed in a vertical direction, and the oil path 87 extends substantially perpendicularly to the oil path 86 (refer to FIG. 12). The oil path 87 extends forwardly from the location of the hydraulic pressure control valve 68 to a location below the oil chamber 74, and is communicated at a front end thereof with another oil path 88, which extends substantially perpendicularly to the oil path 87. Check valves 89, 89 are interposed in the opposite left and right end portions of the oil path 88.

The opposite left and right ends of the oil path 88 further extend to the side edges of the housing body 71, and then extend upwardly until they are communicated with the left and right oil chambers 74a and 74b, respectively. In short, the oil paths 83, 84, 86, 87 and 88 are formed in two upper and lower stages in the body 71 of the damper housing 52.

The check valves 85 and 89 have similar configurations to each other. Description is given taking the check valve 85 as an example. A valve seat 85b is provided in a valve body 85a, and a ball 85c is accommodated in the valve body 85a. The ball 85c is biased with suitable biasing force by a spring 85d such that it contacts the valve seat 85b. The check valve 85 permits the fluid to flow in a direction in which the ball 85c is spaced away from the valve seat 85b against the biasing force of the spring 85d, but blocks the working fluid to flow in the reverse direction.

Here, the check valves 85 permit the working fluid to flow from the oil chambers 74a and 74b to the oil path 86 side through the oil paths 83 and 84, but block the working fluid to flow in the reverse direction. Meanwhile, the check valves 89 permit the working fluid to flow to the oil chambers 74a and 74b side through the oil path 88, but block the working fluid to flow in the reverse direction.

As shown in FIG. 10, the hydraulic pressure control valve 68 varies the attenuating force of the steering damper 51. The hydraulic pressure control valve 68 includes a valve seat 68b provided in a valve body 68a and has a poppet 68c accommodated therein in an opposing relationship to the valve seat 68b. The poppet 68c is biased suitably with biasing force by a spring 68d interposed between a bottom spring seat of the poppet 68c and the valve seat 68b so that it is spaced away from the valve seat 68b.

An upper end of a push rod 68e is inserted in a lower end of the poppet 68c, and a lower end of the push rod 68e is connected to the linear solenoid 69. The pushing force of the poppet 68c is adjusted by an exciting operation of the linear solenoid 69, such that a head portion of the poppet 68c contacts the valve seat 68b, against the biasing force of the spring 68d.

In particular, according to the hydraulic pressure control valve 68, the position of the poppet 68c is determined by the pressure difference between the left and right oil chambers 74a and 74b in the damper housing 52, communicating with the spaces in the head portion and the bottom portion of the poppet 68c, and also by the biasing force of the spring 68d and the force of the linear solenoid 69, acting through the push rod 68e.

When the resultant force of the poppet pressing force caused by the pressure difference between the left and right oil chambers 74a and 74b and the biasing force of the spring 68d is lower than the exciting force of the linear solenoid 69, the poppet 68c contacts the valve seat 68b to control the hydraulic pressure control valve 68 to a closed state.

However, when the resultant force of the poppet pressing force, caused by the pressure difference between the left and right oil chambers 74a and 74b and the biasing force of the spring 68d, exceeds the exciting force of the linear solenoid 69, the poppet 68c is spaced away from the valve seat 68b, to partially or fully open the hydraulic pressure control valve 68. Then, when the working fluid passes through a gap between the valve seat 68b and the poppet 68c of the hydraulic pressure control valve 68, predetermined attenuating force is obtained.

It is to be noted that the linear solenoid 69 is controlled by a control section (not shown), so that higher exciting force is exhibited as the vehicle speed or the acceleration of the vehicle body increases.

As shown in FIG. 12, a bypass oil path 91 is formed between the oil path 86 and the oil path 87, and a pressure relief valve 92 is interposed in the bypass oil path 91. The pressure relief valve 92 is structured such that it includes a valve seat 92b, provided in a valve body 92a and having a ball 92c accommodated therein, and the ball 92c is biased toward the valve seat 92b side with suitable biasing force by a spring 92d. While the ball 92c normally contacts the valve seat 92b, if the pressure difference between the oil path 86 and the oil path 87 becomes higher than a predetermined value, then the ball 92c is moved so as to be spaced away from the valve seat against the biasing force of the spring 92d, by pressing force based on the pressure difference, to open the relief valve 92 and to thereby moderate the pressure difference between the oil path 86 and the oil path 87.

Here, a pressure control valve 100 for substantially varying the attenuating force upon operation of the steering system 50 is formed from the electric pressure control valve 68 and the relief valve 92, as a mechanical pressure control valve, disposed in parallel to each other between the entrance side oil path and the exit side oil path.

Figure 14:
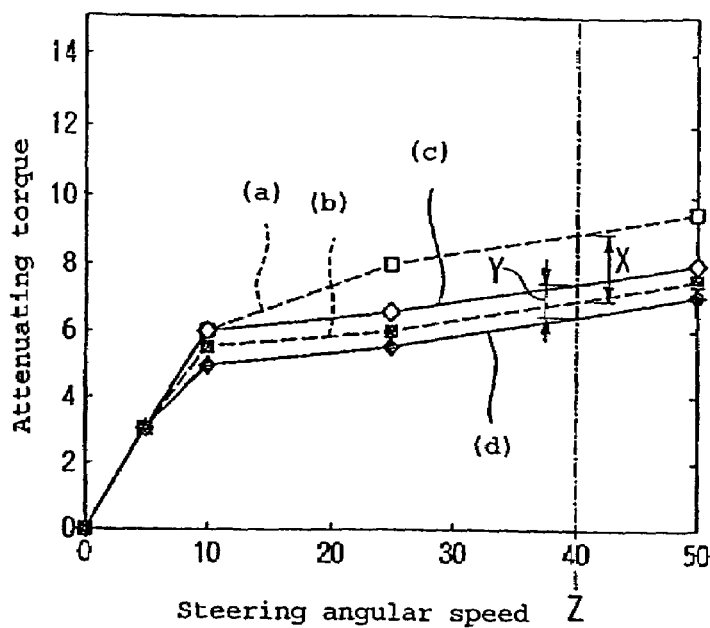
FIG. 14 is a maximum attenuation characteristic diagram of a steering damper system.

Further, the maximum opening pressure of the electric pressure control valve 68 is set such that the lower limit value ((b) in FIG. 14) to the dispersion of the maximum releasing pressure is higher than the lower limit value ((d) in FIG. 14) to the dispersion of the valve opening pressure of the relief valve 92. More preferably, the maximum opening pressure of the electric pressure control valve 68 is additionally set such that the lower limit value ((b) in FIG. 14) to the dispersion of the maximum releasing pressure of the electric pressure control valve 68 is lower than the upper limit value ((c) in FIG. 14) to the dispersion of the valve opening pressure of the relief valve 92. In short, the maximum opening pressure of the electric pressure control valve 68 is set such that the lower limit value ((b) in FIG. 14) to the dispersion of the maximum releasing pressure of the electric pressure control valve 68 is positioned between the upper limit value ((c) in FIG. 14) and the lower limit value ((d) in FIG. 14) to the dispersion of the valve opening pressure of the relief valve 92.

A free piston 93 is communicated with the oil path 88. The free piston 93 is structured such that it includes a cylinder 93a formed integrally with the body 71, a piston 93c for defining a reservation portion 93b for reserving the working fluid forwardly of the cylinder 93a, and a spring 93d for biasing the piston 93c to the reservation portion side. In the free piston 93, when the working fluid filled in a closed space formed from the oil chambers 74a and 74b and the oil paths 83 and 84 and so forth for communicating the oil chambers with each other is expanded or contracted by a temperature variation, the piston 93c moves to change the volume of the reservation portion 93b to thereby absorb the thermal expansion and so forth of the working fluid.

Subsequently, action of the attaching structure for the steering damper in the motorcycle having the configuration described above is described.

If the handlebars 21 are turned, for example, to the left side upon running, then the top bridge 49 is turned in the same direction integrally with the handlebars 21, and this motion of the top bridge 49 is transmitted to the damper shaft 53 of the steering damper 51 through the linkage 56. Then, the damper shaft 53 is also turned in the counterclockwise direction in FIG. 11, and thereupon the vane 75 is turned in the same direction ((a) in FIG. 11). Thereupon, the oil chamber 74b is narrowed to increase the pressure of the working fluid filled therein, and the working oil in the oil chamber 74b moves directly into the oil chamber 74a on the other side through the gap between the vane 75 and the inner peripheral face which defines the oil chamber 74 and so forth. While some working fluid directly moves between the oil chambers 74a and 74b in this manner, even though, when the pressure of the working fluid in the oil chamber 74b which is narrowed becomes high, the working fluid passes through the oil path 84 and the check valve 85 into the oil path 86, and then moves from the oil path 86 to the hydraulic pressure control valve 68.

The hydraulic pressure control valve 68 normally is in a closed state because the poppet 68c contacts the valve seat 68b under the force of the linear solenoid 69, and for example, even if some pressure of the working fluid is applied from the oil chamber 74b side, the closed state is kept. However, if the resultant force of the pressing force based on the pressure difference between the left and right oil chambers 74a and 74b and the biasing force of the spring 68d exceeds the exciting force of the linear solenoid 69, then the poppet 68c is spaced away from the valve seat 68b to open the hydraulic pressure control valve 68. At this time, the working fluid in the oil path 86 passes through the gap between the valve seat 68b and the poppet 68c of the hydraulic pressure control valve 68 to the oil path 87, and further moves from the oil path 87 to the left side oil chamber 74a through the oil path 88 and the check valve 89. The resistance when the working fluid passes through the hydraulic pressure control valve 68 and so forth generates attenuating force in this manner and acts upon the handlebars 21. In short, the attenuating force acts as resisting force when the handlebars 21 are turned, and further acts as resisting force against instantaneous turning force acting upon the handlebars.

While the foregoing description applies to a case wherein the handlebars 21 are turned to the left side, it similarly applies also to another case wherein the handlebars 21 are turned to the right side.

The linear solenoid 69 is controlled in accordance with the vehicle speed or the acceleration of the vehicle body and is controlled by a control section (not shown) so that, for example, the exciting force increases as the vehicle speed increases or as the acceleration of the vehicle body increases. Accordingly, at this time, the opening timing of the hydraulic pressure control valve 68 is delayed, and besides, even after the hydraulic pressure control valve 68 is opened, the valve opening is smaller by an amount corresponding to the increase of the exciting force and increased attenuating force is exhibited. In short, as the vehicle speed increases or as the acceleration increases, increased attenuating force is exhibited.

Accordingly, when the vehicle body runs at a low speed or at a low acceleration, importance is attached to handling properties, and the handlebars 21 can be turned with comparatively low force. However, when the vehicle body runs at a high speed or at a high acceleration, high attenuating force acts when the handlebars 21 are turned. Consequently, occurrence of a kickback phenomenon can be reduced.

It is to be noted that, during control of the steering damper 51, if the pressure of the working fluid in one of the left and right oil chambers 74a and 74b rises by some reason until the pressure difference of the working fluid between the upstream side and the downstream side of the hydraulic pressure control valve 68 becomes higher than the value set in advance, the relief valve 92 is opened.

Consequently, the working fluid in the oil path 86 is permitted to flow into the oil path 87 through the bypass oil path 91, to thereby moderate the increased pressure difference. In other words, pressure of the working fluid in one of the oil chambers is prevented from becoming excessively high.

Further, if the temperature of the working fluid filled in the oil chamber 74, oil paths 83 and 84, and so forth varies to expand or contract the working fluid, then the piston 93c in the free piston 93 moves within the cylinder 93a, in response to the expansion or contraction of the working fluid, to thereby absorb the volume variation of the working fluid.

In the embodiment described above, the damper housing 52 of the steering damper 51 extends rearwardly farther than the top bridge 49, and the linear solenoid 69 which composes the actuator for the hydraulic pressure control valve 68 is advantageously located below the extension 52a of the damper housing 52. Therefore, effective utilization of the gap between the top bridge 49 and the fuel tank 14 disposed rearwardly of the top bridge 49 can be anticipated, and the linear solenoid 69 can be advantageously located while the overall height of the steering damper 51 is suppressed.

Further, since the linear solenoid 69 does not project upwardly from the damper housing 52, the linear solenoid 69 can be prevented from interfering with a movable member in the proximity of the top bridge 49 which moves together with the handlebars or the like. Furthermore, the overall length of the steering damper 51 can be reduced, when compared with an alternative case wherein the linear solenoid is attached such that it projects rearwardly, and the degree of freedom in layout of the fuel tank 14 and so forth increases as much.

Further, when the damper shaft 53 is attached to the steering system 50, it is attached through the linkage 56. Therefore, when the damper housing 52 is to be attached to the top bridge 49, even if the damper shaft 53 is attached in a displaced relationship from the axial line of the head pipe 3 or the steering stem 6, the function of the steering damper 51 is not deteriorated.

In particular, it is preferable to attach the steering damper 51 such that the damper shaft 53 may be coaxial with the axial line of the head pipe 3 or the steering stem 6. However, it cannot be avoided that the damper shaft 53 is assembled in a displaced relationship from the axial line of the steering stem 6 or the like because of failure of the accuracy of parts, the assembly error of the parts and so forth.

In this instance, where the damper shaft 53 is attached directly to the top bridge 49, since the centers of rotation of them are displaced from each other, smooth movement is not assured, and the function of the steering damper 51 cannot be exhibited. Here, since the damper shaft 53 is attached to the steering system 50 through the linkage 56, occurrence of such a trouble as just described can be prevented.

Further, since, in the steering damper 51 described above, the oil paths are formed in two upper and lower stages in the damper housing 52, a compact configuration of the damper housing 52 in a plane can be anticipated when compared with that in an alternative case wherein the oil paths are formed in one stage. Consequently, the degree of freedom in layout of the fuel tank 14 and so forth further increases.

It is to be noted that the embodiment described above is only one example of an illustrative embodiment of the present invention, and can be modified suitably when necessary without departing from the spirit and scope of the present invention.

For example, in the embodiment described above, the damper housing 52 of the steering damper 51 is attached to the vehicle body frame 2 side, while the damper shaft 53 is attached to the steering system 50. However, the damper housing 52 of the steering damper 51 may be attached to the steering system 50 while the damper shaft 53 is attached to the vehicle body frame 2 side conversely.

Further, while, in the embodiment described above, the damper housing 52 of the steering damper 51 is attached to the head pipe 3, it may otherwise be attached directly or through a stay to a rearward extension of the vehicle body frame 2 which extends rearwardly from the head pipe 3.

Furthermore, while, in the embodiment described above, the linear solenoid 69 is used as the actuator for the hydraulic pressure control valve 68, the actuator is not limited to this, but another alternative actuator may be used instead, which utilizes a hydraulic pressure or the like.

As described in detail above, according to the attaching structure for a steering damper in a motorcycle of the invention of the present application, effective utilization of the gap between the top bridge and the fuel tank or the like which is a part normally disposed rearwardly of the top bridge can be anticipated. Besides, even if the actuator for driving the hydraulic pressure control valve is comparatively great, it can be advantageously located while the height thereof is suppressed low.

Further, the actuator does not project upwardly from the housing, and therefore, the actuator can be prevented from interfering with a movable member in the proximity of the top bridge which moves together with a handlebar or the like. Furthermore, the overall length of the steering damper can be reduced, and this increases the degree of freedom in layout of the fuel tank and other parts.

The lower limit value ((b) in FIG. 14) to the dispersion of the maximum opening pressure of the electric pressure control valve 68 is set so as to be positioned between the upper limit value ((c) in FIG. 14) and the lower limit value ((d) in FIG. 14) to the dispersion of the valve opening pressure of the relief valve 92. At this time, since the valve opening when the maximum attenuating force is exhibited is performed by that one of the relief valve 92 and the electric pressure control valve 68 which has a lower opening pressure, the relief valve 92 which has a smaller dispersion as a product is likely to be opened earlier. Accordingly, the dispersion width of the maximum attenuating force generated in the system and exhibited by synthesis of the relief valve 92 and the electric pressure control valve 68 depends upon the relief valve 92.

Figure 15:
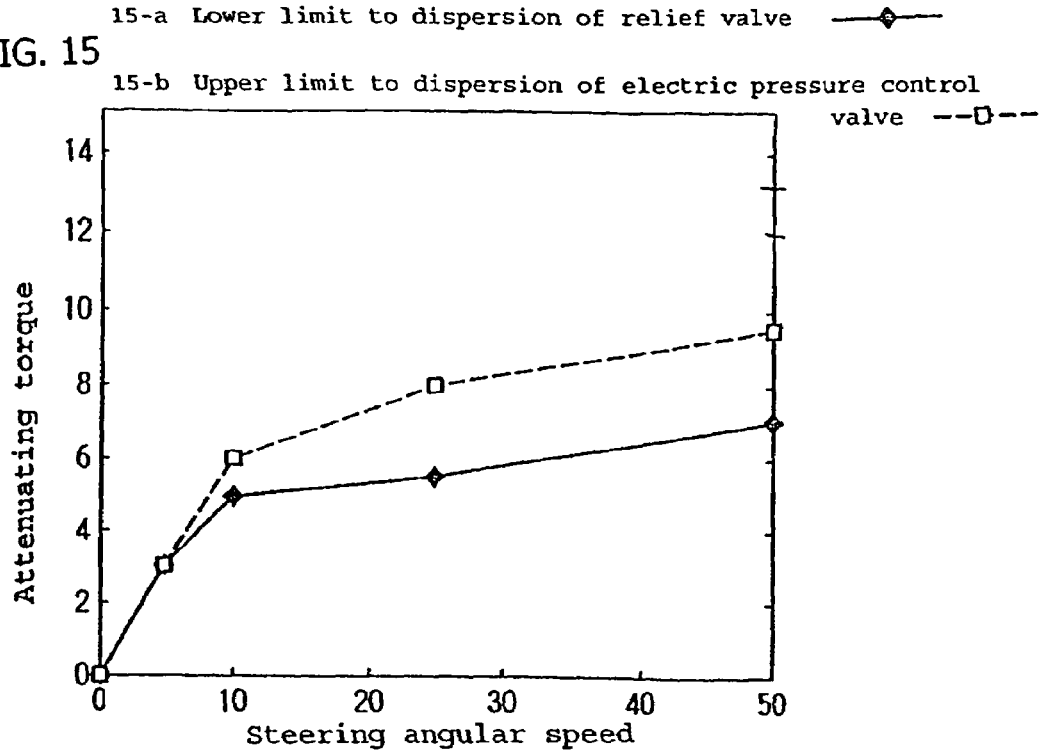
FIG. 15 is a maximum attenuation characteristic diagram of the steering damper system when the product dispersion of an electric pressure control valve is at an upper limit and the product dispersion of a relief valve is at a lower limit.
Figure 16:
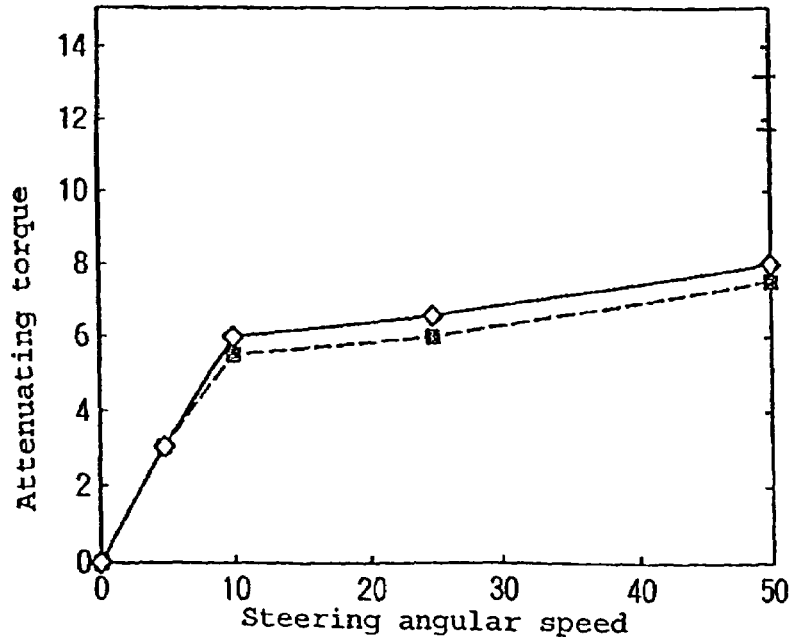
FIG. 16 is a maximum attenuation characteristic diagram of the steering damper system when the product dispersion of an electric pressure control valve is at a lower limit and the product dispersion of a relief valve is at an upper limit.

In short, the lower limit value to the dispersion of the maximum attenuating force generated in the system and exhibited by synthesis of the relief valve 92 and the electric pressure control valve 68 depends upon the lower limit value to the dispersion width of the relief valve 92 as seen in FIG. 15 while the upper limit value to the dispersion depends upon the upper limit value of the relief valve 92 as seen in FIG. 16. As a result, the dispersion width of the maximum attenuating force generated in the system and exhibited by synthesis of the relief valve 92 and the electric pressure control valve 68 is reduced.

Incidentally, for example, where the steering angular speed of the steering system is in the proximity of Z as seen in FIG. 14, in a conventional steering damper which only includes the electric pressure control valve 68, the dispersion width of the maximum attenuating force is "X" which depends upon the dispersion of the electric pressure control valve 68. In contrast, in the steering damper 51 of the system of the present embodiment wherein the relief valve 92 and the electric pressure control valve 68 are arranged in parallel to each other, the dispersion width of the maximum attenuating force is "Y" which depends upon the dispersion of the relief valve 92, and the value of "Y" is much smaller than the value of "X".

Although the present invention has been described herein with respect to a specific illustrative embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having thus, described the invention, what is claimed is:

1. A rotary steering damper for a motorcycle, said steering damper comprising;
    a damper housing having an oil chamber formed therein and having a plurality of fluid flow channels in fluid communication with said oil chamber;
    a damper shaft attached to and extending downwardly from said damper housing;
    a vane disposed in the oil chamber of the housing and attached to the shaft for concurrent pivotal movement therewith, said vane operating to effectively partition the housing oil chamber into left and right oil chambers; and
    a hydraulic pressure control valve for varying an attenuating force of said steering damper,
    wherein, upon pivotal rocking motion of said vane in said housing, working fluid flows between the left and right oil chambers to generate attenuating force,
    and wherein said housing is adapted to be attached to one of a vehicle body frame side and a steering system side while said shaft is adapted to be attached to the other of said vehicle body frame side and said steering system side, and said housing is adapted to be disposed above a top bridge;

wherein said damper housing comprises a housing extension which extends rearwardly behind said top bridge; and wherein said steering damper further comprises an actuator for said hydraulic pressure control valve, the actuator disposed such that an upper surface of said actuator is secured to a lower surface of the housing extension, the lower surface extending in a direction normal to an axis of the shaft.

2. A rotary steering damper according to claim 1, wherein said housing is adapted to be attached to said vehicle body frame side, and said shalt is adapted to be attached to said steering system side.

3. A rotary steering damper according to claim 1, wherein the actuator comprises an electric solenoid.

4. A rotary steering damper according to claim 1, wherein said housing comprises a base and a lid removably attached to the base.

5. A steering damper kit for use wit a motorcycle, said kit comprising, a rotary steering damper, said steering damper comprising;
  a damper housing having an oil chamber formed therein and having a plurality of fluid flow channels in fluid communication with said oil chamber;
  a damper shaft attached to and extending downwardly from said damper housing;
  a vane disposed in the oil chamber of the housing and attached to the shaft for concurrent pivotal movement therewith, said vane operating to effectively partition the housing oil chamber into left and right oil chambers; and
  a hydraulic pressure control valve for varying an attenuating force of said steering damper;
  wherein, upon pivotal rocking motion of said vane in said housing, working fluid flows between the left and right oil chambers to generate attenuating force,
  and wherein said housing is adapted to be attached to one of a vehicle body frame side and a steering system side while said shaft is adapted to be attached to the other of said vehicle body frame side and said steering system side, and said housing is adapted to be disposed above a top bridge;
  wherein said damper housing comprises a housing extension which extends rearwardly behind said top bridge; and wherein said steering damper further comprises an actuator for said hydraulic pressure control valve, the entirety of said actuator being disposed below said housing extension, the steering damper kit further comprising a linkage member comprising dual pivot connections, and a bifurcated steering torque transfer arm for connecting between said linkage member and said damper shaft of said steering damper.

6. A steering damper for a vehicle wherein a pressure control valve is interposed in an oil path formed in a damper housing provided between a vehicle body frame and a steering system such that said pressure control valve is controlled to vary an attenuating force upon operation of said steering system, said pressure control valve comprising:
  an electric pressure control valve provided in a connecting oil pat for communicating an exit side oil path into which working fluid is discharged from an oil chamber of said damper housing and an entrance side oil path along which the working fluid returns to said oil chamber and operable to change the attenuating force upon operation of said steering system in accordance with an electric signal; and
  a mechanical pressure control valve provided in a bypass oil path provided in parallel to said electric pressure control valve in such a manner as to open when the pressure in said bypass oil path becomes equal to a predetermined value,
  wherein a maximum opening pressure of said electric pressure control valve is set so that a lower limit value to a dispersion thereof
  is higher than a lower limit value to a dispersion of an opening pressure of said mechanical pressure control valve, and
  is lower than an upper limit value to a dispersion of an opening pressure of said mechanical pressure control valve.

7. The steering damper for a vehicle of claim 6, wherein said steering damper comprises:
  said damper housing having an oil chamber formed therein and having a plurality of fluid flow channels in fluid communication with said oil chamber;
  a damper shaft attached to and extending downwardly from said damper housing;
  a vane disposed in the oil chamber of the housing and attached to the shaft for concurrent pivotal movement therewith, said vane operating to effectively partition the housing oil chamber into left and right oil chambers; and
  said pressure control valve for varying an attenuating force of said steering damper;
  wherein, upon pivotal rocking motion of said vane in said housing, working fluid flows between the left and right oil chambers to generate attenuating force;
  wherein said housing is adapted to be attached to one of the vehicle body frame and the steering system while said shaft is adapted to be attached to the other of said vehicle body frame and said steering system, and said housing is adapted to be disposed above a top bridge; and
  wherein said damper housing comprises a housing extension which extends rearwardly behind said top bridge; and wherein said steering damper further comprises an actuator for said hydraulic pressure control valve, said actuator being disposed below said housing extension such that an upper surface of the actuator underlies a lower surface of the damper housing.

8. A motorcycle, comprising a frame having a head pipe with an integral flange extending rearwardly from a top portion thereof, and a steering column pivotally attached to said head pipe, said motorcycle further comprising a rotary steering damper comprising;
  a damper housing having an oil chamber formed therein and having a plurality of fluid flow channels in fluid communication with said oil chamber;
  a damper shaft attached to and extending downwardly from said damper housing;
  a vane disposed in the oil chamber of the housing and attached to the shaft for concurrent pivotal movement therewith, said vane operating to effectively partition the housing oil chamber into left and right oil chambers; and
  a hydraulic pressure control valve disposed in said damper housing for varying an attenuating force of said steering damper;
  wherein, upon pivotal rocking motion of said vane in said housing, oil flows between the left and right oil chambers to generate attenuating force,
  and wherein said housing is attached to one of a vehicle body frame side and a steering system side of said motorcycle, while said shaft is attached to the other of said vehicle body frame side and said steering system side, and said housing is disposed above a top bridge of said motorcycle;

wherein said damper housing further comprises a housing extension which extends rearwardly behind said top bridge; and wherein said steering damper further comprises an actuator for said hydraulic pressure control valve, said actuator being secured to a lower surface of the housing extension, the lower surface extending in a direction normal to an axis of the damper shaft.

9. The motorcycle of claim 8, wherein said damper housing is attached to said vehicle body frame side, and said shaft is attached to said steering system side.

10. The motorcycle of claim 8, wherein the actuator comprises an electric solenoid.

11. The motorcycle of claim 8, wherein said damper housing comprises a base and a lid removably attached to the base.

12. The motorcycle of claim 8, further comprising a plurality of brackets situated between the steering damper and the flange on the bead pipe.

13. A motorcycle, comprising a frame having a head pipe with an integral flange extending rearwardly from a top portion thereof, and a steering column pivotally attached to said head pipe, said motorcycle further comprising a rotary steering damper comprising;
    a damper housing having an oil chamber formed therein and having a plurality of fluid flow channels in fluid communication wit said oil chamber;
    a damper shaft attached to and extending downwardly from said damper housing;
    a vane disposed in the oil chamber of the housing and attached to the shaft for concurrent pivotal movement therewith, said vane operating to effectively partition the housing oil chamber into left and right oil chambers; and
    a hydraulic pressure control valve disposed in said damper housing for varying an attenuating force of said steering damper,
    wherein, upon pivotal rocking motion of said vane in said housing, oil flows between the left and right oil chambers to generate attenuating force, and wherein said housing is attached to one of a vehicle body frame side and a steering system side of said motorcycle, while said shaft is attached to the other of said vehicle body frame side and said steering system side, and said housing is disposed above a top bridge of said motorcycle;
    wherein said damper housing further comprises a housing extension which extends rearwardly behind said top bridge; and wherein said steering damper further comprises an actuator for said hydraulic pressure control valve, said actuator being disposed below said housing extension, the rotary steering damper further comprising a linkage member comprising dual pivot connections, and a bifurcated steering torque transfer arm connecting said linkage member and said damper shaft of said steering damper.

14. A rotary steering damper for a motorcycle steering system, said steering damper comprising;
    a damper housing having an oil chamber formed therein and having a plurality of fluid flow channels in fluid communication with said oil chamber;
    a damper shaft attached to and extending downwardly from said damper housing;
    a vane disposed in the oil chamber of the housing and attached to the shaft for concurrent pivotal movement therewith, said vane operating to effectively partition the housing oil chamber into left and right oil chambers; and
    a hydraulic pressure control valve for varying an attenuating force of said steering damper;
    wherein, upon pivotal rocking motion of said vane in said housing, working fluid flows between the left and right oil chambers to generate attenuating force,
    and wherein said housing is adapted to be attached to one of a vehicle body frame side and a steering system side while said shaft is adapted to be attached to the other of said vehicle body frame side and said steering system side, and said housing is adapted to be disposed above a top bridge;
    wherein said damper housing comprises a housing extension which extends rearwardly behind said top bridge; and wherein said steering damper further comprises an actuator for said hydraulic pressure control valve, said actuator being disposed below said housing extension such that an upper surface of the actuator underlies a lower surface of the damper housing, the lower surface of the damper housing extending in a direction tat is substantially normal to an axis of the shaft.

15. The steering damper of claim 14 wherein the hydraulic pressure control valve varies the attenuating force upon operation of said steering system, and said hydraulic pressure control valve comprises:
    an electric pressure control valve operable to change the attenuating force upon operation of said steering system in accordance with an electric signal; and
    a mechanical pressure control valve provided in parallel to said electric pressure control valve.

16. A rotary steering damper for a motorcycle steering system, said steering damper comprising;
    a damper housing having an oil chamber formed therein and having a plurality of fluid flow channels in fluid communication with said oil chamber;
    a damper shalt attached to and extending downwardly from said damper housing;
    a vane disposed in the oil chamber of the housing and attached to the shaft for concurrent pivotal movement therewith, said vane operating to effectively partition the housing oil chamber into left and right oil chambers; and
    a hydraulic pressure control valve for varying an attenuating force of said steering damper;
    wherein, upon pivotal rocking motion of said vane in said housing, working fluid flows between the left and right oil chambers to generate attenuating force,
    and wherein said housing is adapted to be attached to one of a vehicle body frame side and a steering system side white said shaft is adapted to be attached to the other of said vehicle body frame side and said steering system side, and said housing is adapted to be disposed above a top bridge;
    wherein said damper housing comprises a housing extension which extends rearwardly behind said top bridge; and wherein said steering damper further comprises an actuator for said hydraulic pressure control valve, said actuator being disposed below said housing extension such that an upper surface of the actuator underlies a lower surface of the damper housing, the rotary steering damper further comprising a linkage connecting the damper shaft to said steering system side,
    the steering system side comprising a top bridge fixed to both a steering column and handlebars;

the linkage includes a steering torque transfer arm and a link member;

wherein a first end of the steering torque transfer arm is fixed to the damper shaft, a second end of the steering torque transfer arm is rotatably attached to a first end the link member, and a second end of the link member is rotatably attached to the top bridge, wherein movement of the handlebars causes a rotational movement of the top bridge and steering column, and said rotational movement of the top bridge is transferred to the damper shaft via the linkage.

* * * * *